July 29, 1958 — F. A. KROHM — 2,844,839
WINDSHIELD WIPER ARM ASSEMBLY
Filed Jan. 3, 1955
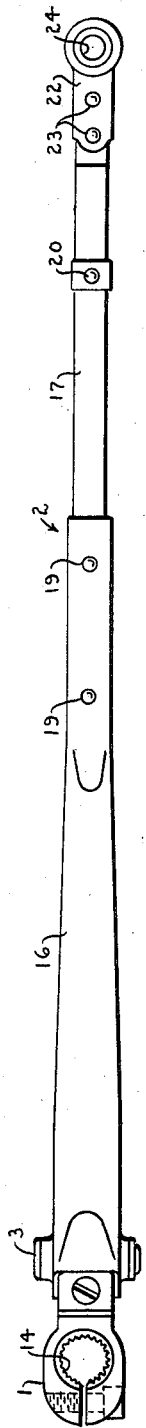
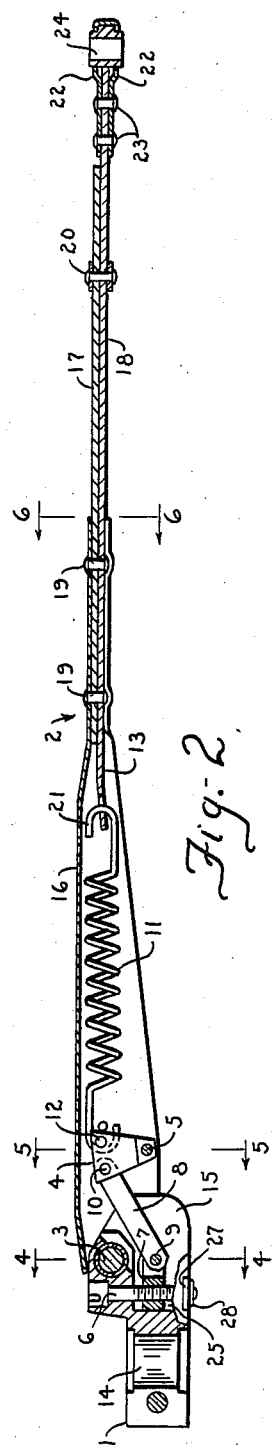
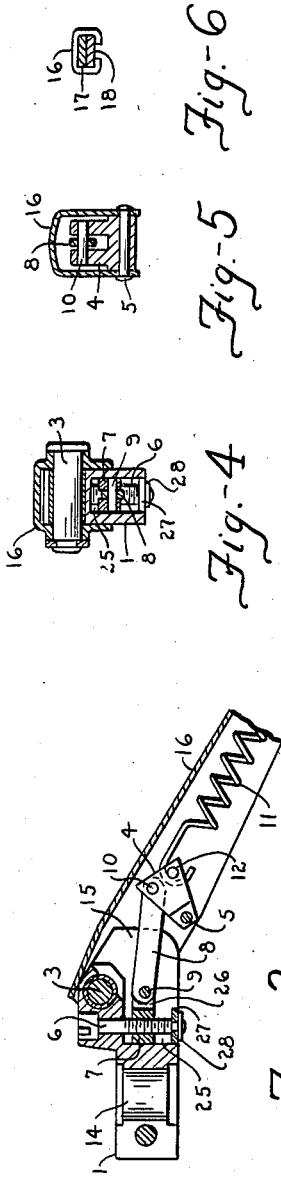
INVENTOR.
FRED A. KROHM
BY
Charles S. Penfold
ATTORNEY

United States Patent Office 2,844,839
Patented July 29, 1958

2,844,839

WINDSHIELD WIPER ARM ASSEMBLY

Fred A. Krohm, Hobart, Ind., assignor to The Anderson Company, a corporation of Indiana Application January 3, 1955, Serial No. 479,288

20 Claims. (Cl. 15—255)

This invention relates generally to a windshield wiper arm assembly and more particularly to means for controlling the action of the spring which is associated therewith for urging the arm toward the windshield.

The arm assembly, embodying the invention, is primarily suitable for use with a curved windshield but may also be used to advantage on flat windshields. The magnitude of curvature of some windshields is such that the outer blade carrying section of the arm will move inwardly and outwardly as much as six inches as the blade travels back and forth on the windshield. The arm includes an inner section which is adapted to be connected to a drive shaft, and when connected thereto and operated the angular relationship between the outer arm section and the shaft will vary considerably due to the inward and outward movement of the outer arm section. The variation in such angular relationship between the arm sections also causes a variation in the pressure exerted by the spring and as a result the blade is not urged against the windshield with a uniform pressure. This lack of uniform or constant pressure in a conventional arm is a distinct disadvantage because it reflects on the ability of the blade to properly wipe the glass.

With the foregoing in mind, the principal object of the invention is to provide a wiper arm assembly with means for obtaining a substantially uniform or constant arm pressure so that the blade will properly function and produce a thorough cleaning job.

More particularly in this regard, an object of the invention is to provide an arm assembly comprising, among other things, an inner shaft attaching section, an outer blade carrying section, a rocker or movable element supported on the outer arm section, a pressure or force producing means such as a spring which is connected to the rocker and outer section for urging the outer section toward a windshield, and a link or connector attached to the rocker and adjustably connected to the inner section for varying the leverage between the rocker and inner section.

In a conventional wiper arm assembly the spring would normally be directly connected to the inner and outer sections of the arm but in the unique assembly above referred to the rocker and link are introduced and are operatively connected with one another and to the other components in such a manner that irrespective of the angular relationship between the inner and outer arm sections, the rocker and link will compensate for any normal variations in the tension of the spring as the blade accommodates itself to the surface of the windshield irrespective of whether the surface of the windshield is curved and/or flat.

An important object of the invention is to provide improved means whereby the tension of the spring may be readily adjusted to vary the pressure of the blade against a windshield. More specifically in this respect, the inner section of the arm assembly is provided with a screw and a nut which is operatively connected to the screw and the link, the arrangement being such that manipulation of the screw in one direction will cause the nut to travel along the screw and effect a change in the leverage between the rocker, link and inner section to increase the pressure exerted by the spring, and manipulation of the screw in a reverse direction will decrease the pressure. The inner arm section is provided with a guideway for the nut and the screw is fastened to the inner section in a manner to stabilize the movement of the nut in the guideway. The arrangement is such that the rocker and link will compensate for any variations in the tension of the spring for the purpose above referred after the spring has been adjusted to a tension required to achieve the wiping action desired for a particular installation.

Another object of the invention is to provide a novel arm assembly which offers advantages with respect to manufacture and assembly and is efficient in operation.

A further object of the invention is to provide an arm assembly in which provision is made for temporarily locking the arm sections at a predetermined angle with the spring under considerable tension so as to facilitate connection of the assembly to a shaft, after which the lock is manipulated to release the sections for operation.

An important object of the invention is to provide an improved wiper arm assembly in which the components employed for obtaining a uniform pressure and adjusting the leverage are substantially located within the confines of the arm.

Many other objects and advantages of the invention will become apparent after the description hereinafter set forth is considered in conjunction with the drawings annexed hereto.

In the drawings:

Figure 1 is a top view of the arm assembly embodying the invention;

Figure 2 is a longitudinal section of the arm assembly exemplifying details of its construction, including means for locking the arm sections in a predetermined angular relationship and the means for adjusting the leverage between the rocker and the inner arm section;

Figure 3 is a partial longitudinal sectional view of the arm assembly showing the operative relationship of the rocker, link and leverage adjusting means when the outer section of the arm is in a position for wiping a windshield;

Figure 4 is a transverse section taken substantially on line 4—4 of Figure 2 illustrating structural details of the leverage adjusting means;

Figure 5 is a transverse section taken through the rocker substantially on line 5—5 of Figure 2; and Figure 6 is a transverse section taken substantially on line 6—6 of Figure 2.

This application is a continuation-in-part of my copending application Serial No. 440,603, filed July 1, 1954.

The arm assembly comprises an inner section 1 for attachment with a drive shaft, an outer blade carrying section generally designated 2 pivotally connected to the inner section by a pivot 3, a movable element or rocker 4 connected to the outer section by a pivot 5, a screw 6, and nut 7 carried by the screw, a link 8 having its ends respectively pivotally connected to the rocker and nut by pivots 9 and 10, and resilient means in the form of a helical spring 11 having its ends respectively connected to the rocker and outer arm section at 12 and 13.

The inner arm section is provided with an aperture 14 for receiving a shaft and a recess 15 within which the inner end of the link 8 and the nut 7 are disposed. The manner in which the screw and nut are mounted will be described subsequently.

The outer arm section 2 includes a tapered channel member or part 16 which is directly connected to the inner section by the pivot 3. The rocker and spring, including the outer end of the link, are substantially housed in this channel member. This outer section also includes a pair of elongated superimposed flat bar members 17 and 18 having their inner ends secured in the outer extremity of the channel 16 by a pair of rivets 19 and they are also secured together by another rivet 20. The lower bar member 18 is somewhat longer than the upper bar member and its inner end is provided with an aperture which receives a hooked end 21 of the spring. A pair of corresponding fittings 22 are secured to the opposite sides of the outer end of the lower bar member 18 by a pair of rivets 23 for holding a transversely disposed tubular bearing 24 in place. A stud on a wiper blade not shown is adapted for attachment to the bearing. Obviously, the arm may be provided with any suitable means for supporting a blade.

The rocker or movable element 4 may be constructed as desired but as herein illustrated is preferably made in the form of a generally triangular block with the pivot 5 extending through the lower corner of the block. The rocker is preferably of a thickness to nest in the channel member for guidance thereby. The upper part of the rocker is preferably bifurcated so as to receive the outer end of the link 8 and the inner hooked end of the spring which take positions in the other or upper corners of the rocker due to the pivots 10 and 12. The spring, if desired, can be attached to the rocker at some other suitable location or to the link. It is to be understood that the rocker can be supported in various ways on the arm. For example, the side walls of the channel member could be provided with inturned projections for supporting the rocker in lieu of the pivot pin shown. Also, if found desirable, a seat could be substituted for the pivot pin and projections.

The means employed for adjusting the leverage action will now be described. The recess 15 in the inner arm section 1 receives the inner end of the link and is narrowed to some extent in order to provide a guideway 25 for the nut 7. The nut is provided with a slotted extension 26 which receives the link 8. The screw 6 is preferably provided with left-handed threads and extends transversely through a clearance opening in the inner arm section and into the guideway 25. The screw is provided with a slotted head to accommodate a tool for manipulating the screw. It will be noted that the head is inset in the upper part of the inner arm section and that the lower part of the screw is provided with a reduced portion journalled in cross-member or bridge 27. The end of the reduced portion is preferably upset against a washer 28 disposed under the bridge to lock the screw to the inner arm section and prevent cocking of the screw. The ends of the bridge 27 preferably nest in notches 29 provided in the lower edges of the side walls of the inner section forming the guideway 25. It will also be noted that the link 8 is located for movement between the pivots 3 and 5.

In view of the foregoing it will be manifest that when the screw is turned clockwise as viewed in Figure 1, the nut will travel inwardly of the guideway 25 and cause the pivot 9 to be moved or raised toward the pivot 3 and this permits the rocker through the link to move in a clockwise direction about its pivot 5 and thereby modify the leverage action between the rocker and inner section to decrease the pressure exerted by the spring. When the screw is rotated in an opposite counter-clockwise direction the screw will travel outwardly of the guideway and cause the pivot 9 to move away from the pivot 3 and slightly pull the rocker in a counter-clockwise direction about its pivot 5 to increase the pressure exerted by the spring. After the spring has been adjusted to a proper tension for a particular installation the rocker and link in cooperation with the other components of the arm assembly will compensate for any variations in the spring tension as the blade on the wiper arm accommodates itself to a windshield having variable degrees of curvature and/or flat surfaces and thereby obtain a uniform or constant pressure, as will appear more completely in the following description of the operation of the arm assembly.

By referring to Figure 3 of the drawing, it will be apparent that the spring directly influences the movement of the rocker and link to cause the outer arm section to move toward a windshield when the arm is applied to a shaft. Whenever the outer arm section moves inwardly, the rocker will move in a clockwise direction as viewed in Figure 3, and when this section moves outwardly, the rocker will move in a counter-clockwise direction. More specifically in this regard, when the outer arm section carrying the blade moves outwardly the distance between the pivot 3 and the longitudinal axis of the link will shorten and have the effect of lengthening or prolonging the spring and when the section moves inwardly the aforesaid distance will lengthen and have the effect of shortening the spring. Otherwise expressed, the link will move toward the pivot 3 when the outer arm section is moved outwardly and away from the pivot 3 and toward pivot 5 when the section is moved inwardly. The rocker serves to accelerate the lengthening and shortening of the effective leverage action between the link and the inner arm section and thereby compensates for any variation in the spring tension resulting from changes in the angular relationship between the arm sections so that a substantially uniform or constant arm pressure is maintained to obtain a thorough wiping job.

As exemplified in Figure 2, a removable pin 29 extends through holes provided therefor in the side walls of the channel member 16. This pin serves as a stop or abutment for the rocker 4 to maintain the arm sections more or less in a straight condition so as to facilitate connecting the inner section to a drive shaft. This conditioning of the arm is preferably done at the factory. After the arm is attached to a shaft the pin is withdrawn to permit the spring to swing the outer section toward a windshield as illustrated in Figure 3. The use of the pin 29 or any other means suitable for the purpose is not necessary, but it does prevent the spring constituting pressure producing or biasing means from forcibly placing the arm sections in an angular relationship or positions from which it is quite difficult to straighten them out so that the inner section can be readily attached to a shaft.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A windshield wiper arm assembly comprising an inner shaft engaging section and an outer blade carrying section pivotally connected to the inner section, a manually actuated member supported on the inner section and a movable element supported on the outer section, resilient means operatively connected to the outer arm section and the movable element, and a connector operatively connecting the movable element and the actuated member, the arrangement being such that the movable element and the connector serve to influence the action of the resilient means so that it will apply a substantially uniform or constant pressure to the outer arm section.

2. A windshield wiper arm assembly comprising an inner section having an exposed portion provided with an opening for receiving a drive shaft, an outer section having a channel pivotally connected to and receiving another portion of the inner section, means provided on the free end of the outer arm section for supporting a wiper blade, a movable element pivotally supported in the channel of the outer section, a spring having its opposite ends respectively attached to the outer arm section and to the movable element, and a connector attached to the movable element and adjustably connected to the inner section in a manner whereby after adjustment said movable element and connector will automatically compensate for any variation of the tension of the spring resulting from any change in the angular relationship between the inner and outer arm sections.

3. A windshield wiper arm assembly comprising an inner shaft engaging section and an outer arm blade carrying section pivotally connected to the inner section, a movable element mounted on the outer arm section, a connector attached to the movable element, pressure producing means acting on the movable element to urge the outer section in a predetermined direction, means connecting the connector to the inner section in a manner whereby the pressure of the producing means may be adjusted as desired through movement of the connector and element, the arrangement being such that after the producing means is adjusted the movable element and connector serve to compensate for any variations in the pressure produced by the pressure producing means resulting from any variations in the angular relationship between the inner and outer arm sections.

4. A windshield wiper arm assembly comprising an inner shaft attaching section and an outer blade carrying section pivotally connected to the inner section, manually adjustable means carried by the inner section, a rocker pivotally mounted on the outer arm section, a link having a portion connected to the adjustable means and a portion connected to the rocker, and a helical spring having one end connected to the outer arm section and its other end connected to act on the rocker for urging the outer section in a predetermined direction.

5. A windshield wiper arm assembly comprising an inner shaft engaging section and an outer blade carrying section pivotally connected to the inner section, movable means mounted on the outer arm section, a recess provided in the inner arm section, an elongated link having one end pivotally mounted in the recess and its other end pivotally connected to the movable means, an elongated spring acting on the outer arm section and the movable means for urging the outer section toward a windshield, and means whereby the said one end of the link can be moved and secured in different positions.

6. A windshield wiper arm assembly comprising an inner shaft engaging section and an outer blade carrying section pivotally connected to the inner section, a rocker member pivotally mounted on the outer arm section, a recess provided in the inner arm section, means movable in the recess, means for manipulating the movable means, an elongated link member having its ends respectively connected to the rocker and the movable means, biasing means operatively connecting the outer arm section with one of said members for directing the outer section toward a windshield and means for temporarily locking the rocker in a position whereby to maintain the inner and outer arm sections in a substantially straight condition.

7. A windshield wiper arm assembly comprising an inner shaft attaching section and an outer blade carrying section pivotally connected to the inner section, adjustable means on the inner section, a spring, means operatively connecting the spring to the outer section and to the adjustable means on the inner section for urging the outer section in a predetermined direction, and means for temporarily locking the operatively connecting means so that the spring is rendered inoperative to influence the operation of the inner section.

8. A windshield wiper arm assembly comprising an inner shaft attaching section and an outer wiper blade carrying section pivotally connected to the inner section, a rocker pivotally mounted on the outer section, adjustable means operatively connecting the inner section and the rocker, and a spring secured to the outer arm section and to the rocker for urging the outer section in a predetermined direction.

9. A windshield wiper arm comprising an inner section for attachment to a shaft, an outer blade carrying section pivotally connected to the inner section, said inner section being formed to provide a guideway, a member disposed for movement in the guideway, means for effecting movement of the member, a rocker movably supported on the outer section, biasing means operatively connecting the rocker with the outer section, and means operatively connecting the rocker and movable member.

10. A windshield wiper arm comprising an inner section for attachment to a shaft, an outer blade carrying section pivotally connected to the inner section, a rockable element mounted on the outer section, biasing means operatively connecting the element to the outer section, and means operatively and adjustably connecting the element to the inner section for varying the leverage between the element and inner section.

11. A windshield wiper arm comprising an inner section for attachment to a shaft, an outer blade carrying section pivotally connected to the inner section, said inner section being formed to provide a guideway, a screw rotatably mounted on the inner section and extending into the guideway, means for locking the screw to the inner section and holding it against cocking, a nut carried by the screw, a movable member mounted on the outer section, resilient means operatively connecting the member to the outer section and means operatively connecting the member and the nut.

12. A windshield wiper arm assembly comprising an inner shaft engaging section and an outer blade carrying section pivotally connected to the inner section, said inner section being provided with guide means, a slidable actuated member guided by said guide means, a manual actuator connected to said actuated member for moving the member relative to the inner section, a movable element supported on the outer section, resilient means operatively connected to the outer arm section and the movable element, and a connector operatively connecting the movable element and the actuated member, the arrangement being such that the movable element and the connector serve to influence the action of the resilient means so that it will apply a substantially uniform or constant pressure to the outer arm section.

13. A windshield wiper arm assembly comprising an inner section having an exposed portion provided with an opening for receiving a drive shaft, an outer section having a channel pivotally connected to and receiving another portion of the inner section, means provided on the free end of the outer arm section for supporting a wiper blade, a movable element pivotally supported in the channel of the outer section, a spring having its opposite ends respectively attached to the outer arm section and to the movable element, manually adjustable means carried by one of the sections, and a connector attached to the movable element and adjustable means in a manner whereby after said means is adjusted said movable element and connector will automatically compensate for any variation of the tension of the spring resulting from any change in the angular relationship between the inner and outer arm sections.

14. A windshield wiper arm assembly comprising an inner shaft engaging section and an outer arm blade carrying section pivotally connected to the inner section, a movable element mounted on the outer arm section, a connector attached to the movable element, pressure producing means acting on the movable element to urge the outer section in a predetermined direction, a screw supported on the inner section, a nut carried by the screw, and means connecting the connector to the nut, the arrangement being such that after the pressure producing means is adjusted by the screw and nut the movable element and connector serve to compensate for any variations in the pressure resulting from any variations in the angular relationship between the inner and outer arm sections.

15. A windshield wiper arm assembly comprising an inner shaft attaching section and an outer blade carrying section pivotally connected to the inner section, a manual actuator carried by the inner section, an actuated member guided by said inner section and operatively connected to the actuator, a rocker pivotally mounted on the outer arm section, a link having a portion connected to the actuated member and a portion connected to the rocker, and a spring having a portion connected to the outer arm section and another portion acting on the rocker for urging the outer section in a predetermined direction.

16. A windshield wiper arm assembly comprising an inner shaft engaging section and an outer blade carrying section pivotally connected to the inner section, movable means mounted on the outer arm section, a recess provided in the inner arm section, a manually operable screw mounted solely for rotation on the inner section, a nut carried by the screw for axial adjustment thereon, an elongated link having one end disposed in the recess and connected to the nut and its other end pivotally connected to the movable means, and an elongated spring acting on the outer arm section and the movable means for urging the outer section toward a windshield.

17. A windshield wiper arm assembly comprising an inner section provided with a transverse opening for receiving a shaft and an outer blade carrying section pivotally connected to the inner section, a rocker pivotally mounted on the outer arm section at a location forward of the pivotal connection between the sections, said inner arm section also being provided with a guideway disposed substantially in parallel relation with the longitudinal axis of the opening, means movable in the guideway, means for manipulating the movable means, an elongated link having its ends respectively connected to the rocker and the movable means, biasing means operatively connecting the outer arm section with the rocker for directing the outer section toward a windshield, and means for temporarily locking the rocker in a position whereby to maintain the inner and outer arm sections in a substantially straight condition.

18. A windshield wiper arm assembly comprising an inner shaft attaching section provided with abutment means and an outer blade carrying section pivotally connected to the inner section, adjustable means on the inner section, a spring, means operatively connecting the spring to the outer section and to the adjustable means on the inner section for urging the outer section in a predetermined direction, and a detachable pin engaging the abutment means for temporarily locking the operatively connecting means so that the spring is rendered inoperative to influence the operation of the inner section.

19. A windshield wiper arm assembly comprising an inner shaft attaching section and an outer wiper blade carrying section pivotally connected to the inner section, a rocker pivotally mounted on the outer section, adjustable means comprising a manual actuator mounted on the inner section and a member connected to the rocker and actuator, and a spring secured to the outer arm section and to the rocker for urging the outer section in a predetermined direction.

20. A windshield wiper arm comprising an inner section and an outer blade carrying assembly pivotally connected to the inner section, manually adjustable means carried by the inner section, a device comprising a pair of members pivotally connected together and respectively pivotally connected to the adjustable means and outer assembly at fixed locations, and biasing means operatively connected to said outer assembly and device.

References Cited in the file of this patent

UNITED STATES PATENTS 2,557,755    Nesson _____ June 19, 1951